Patented Feb. 20, 1934

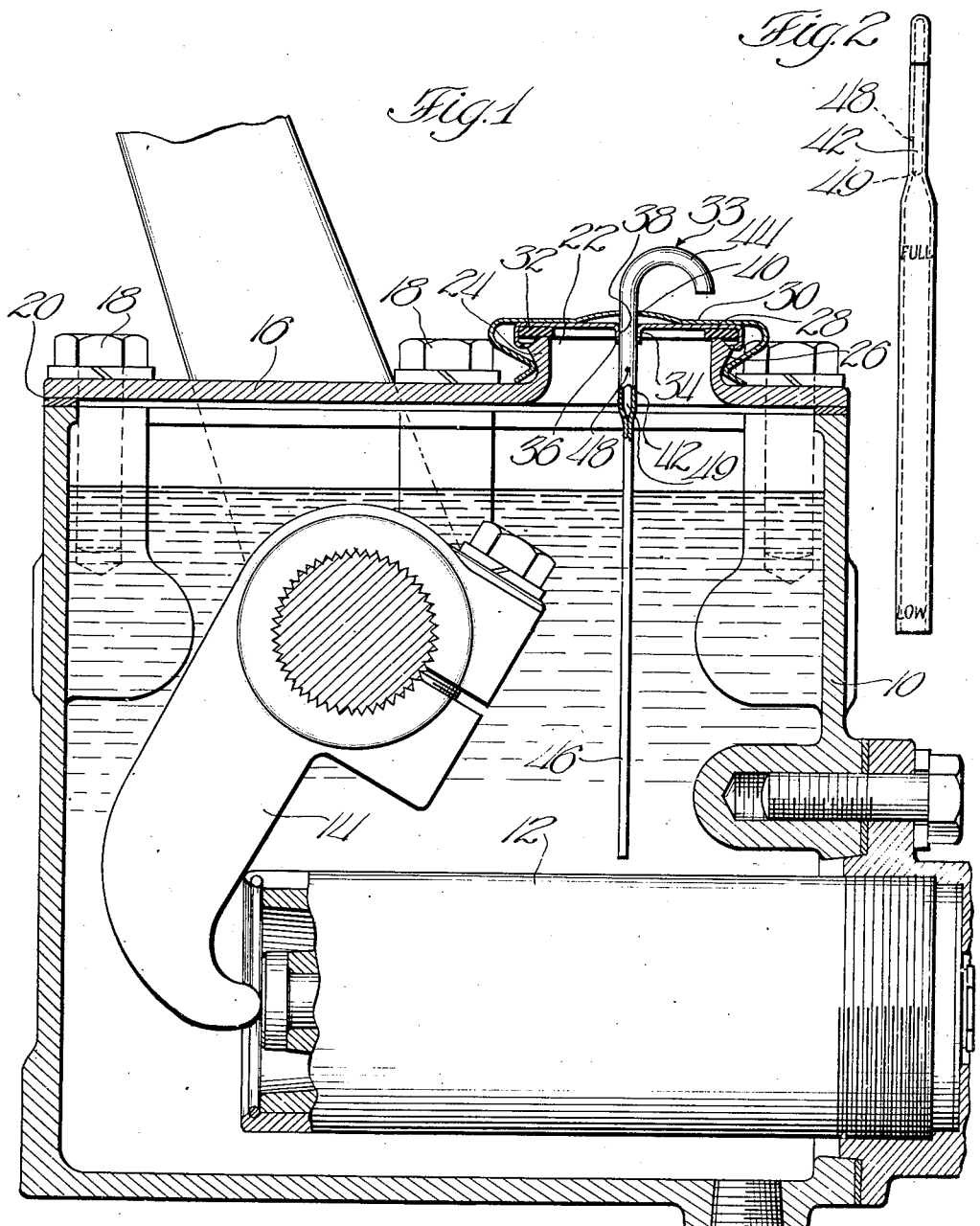

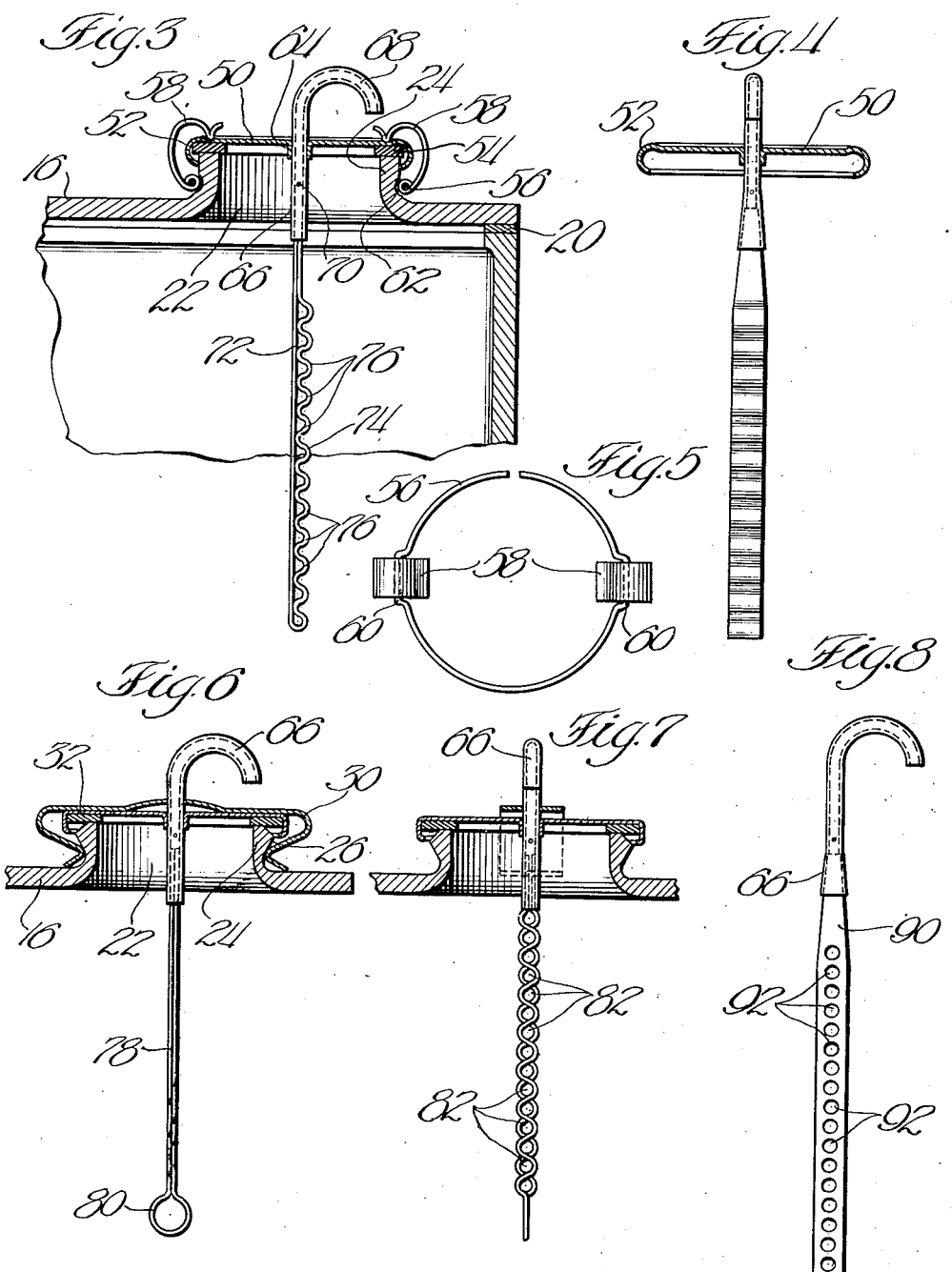

1,948,310

UNITED STATES PATENT OFFICE 1,948,310

COMBINATION ULLAGE ROD AND VENTIDUCT

Wallace F. Oliver and Joseph R. Heidloff, Detroit, Mich., assignors to Hydraulic Brake Company, Los Angeles, Calif., a corporation of California Application February 8, 1930. Serial No. 426,964

3 Claims. (Cl. 73—120)

This invention relates to a combination ullage rod and ventiduct for tanks and more particularly to a device of the character described for use with the fluid reservoir of a hydraulic brake system.

It is an object of this invention to provide a combined ullage rod and ventiduct which is attached to the filling cap of the fluid reservoir of a hydraulic brake system.

Another object of this invention is to provide a new and improved filler cap for supporting the combination ullage rod and ventiduct.

Another object of the invention is to provide a new and improved filler cap carrying a combined ullage rod and ventiduct and improved means for attaching the filler cap on the fluid reservoir.

Another object is to provide an improved type of combined ventiduct and ullage rod having means on the rod for accumulating fluid to visibly indicate how high the fluid level is in the reservoir.

A further object of the invention is to provide in an ullage rod improved means for retaining fluid to visibly indicate the height of the fluid level in the reservoir.

A still further object of the invention is to provide an improved type of combined ullage rod and ventiduct which is easily and cheaply made and adaptable to attachment to a closure cap for a fluid reservoir.

Other objects and advantages will appear more fully from the following specification, reference being had to the accompanying drawings, in which Fig. 1 is a cross-sectional view of the fluid reservoir of a hydraulic brake system, showing our new combination ullage rod and ventiduct and the new closure cap;

Fig. 2 is a front elevational view of the combined ullage rod and ventiduct;

Fig. 3 is a fragmentary view of a fluid reservoir similar to Fig. 1, showing a modified form of the combination ullage rod and ventiduct;

Fig. 4 is a front view thereof;

Fig. 5 is a plan view of a modified form of spring clip for holding the filler cap;

Fig. 6 is a side elevation of a further modified form of ullage rod and ventiduct and also of a modified closure cap;

Fig. 7 is a front view thereof; and

Fig. 8 is a further modified form of combination ullage rod and ventiduct.

Referring to the drawings, in Fig. 1 we have shown a hydraulic brake fluid reservoir 10 containing a master cylinder 12 and operating lever 14, all as more fully disclosed in Patent No. 1,707,063, issued March 26, 1929. The fluid reservoir and master cylinder are integral and the master cylinder is positioned in the lower portion of the reservoir and the fluid level must always be kept above the master cylinder in order for the brake system to function satisfactorily.

A cover plate 16 is fastened on the top of fluid reservoir 10 by a plurality of bolts 18 and a gasket 20 is interposed to provide a fluid seal therebetween. Cover plate 16 is provided with a filling opening 22 surrounded by an upturned flange 24 having a tapered side wall 26.

A filler cap 28 covers opening 22 and is held in closing position by a spring clip 30. Cap 28 may be of an inverted cup-shaped formation, carrying a flexible gasket 32 to make sealing engagement with the top of flange 24. Spring clip 30 is formed from a metallic strip welded or otherwise affixed to the top of cap 28 and extending over the edge thereof and adapted to frictionally engage tapered wall 26.

The improved ullage rod 33 of our invention is attached to cap 28, being vertically positioned in a bearing 34 provided by the turned down flange 36 surrounding the opening 38, through which ullage rod 33 passes. The ullage rod also passes through an opening 40 in spring clip 30.

Ullage rod 33 may be a tubular member having a straight body portion 42, an upper portion 44 arcuately curved, and an elongated end portion 46 which has been flattened. The words "Full" and "Low" are placed upon a flattened side of the tube, corresponding to the amount of fluid necessary for the brake system. A vent opening 48 is provided in the body portion 42 below cap 28 and communicates with the atmosphere through the interior of the ullage rod. The upper portion 44 is arcuately curved so that the opening in the end of the tubular member is not directed upward, thus to a great extent preventing dirt and foreign substances from falling into the body portion 42 to clog vent opening 48. It is obvious, however, that a certain small amount of dirt or other substance may pass into the tube through the end of upper portion 44 and for this purpose a pocket or trap 49 is provided below the vent opening 48. Dirt or dust entering the tube will settle in trap 49 and the possibility of clogging vent opening 48 is greatly minimized.

After assembly of the filler cap and ullage rod it has been found advisable to "Parkerize" the entire unit, both for the purpose of rust-proofing it and also to provide a black, irregular surface on the tube so that the level of the fluid may be more readily observed.

In Figs. 3, 4 and 5 we have illustrated a modified form of filler cap and ullage rod. Cover plate 16 is provided with a filling opening 22 and surrounding flange 24 similar to those shown in Fig. 1. Filler cap 50 is formed of thin metal having a peripheral bead 52 encircling the upper end of flange 24. A gasket 54 is provided between the top of flange 24 and cap 50 to provide a fluid seal therebetween. Means to hold the cap in closing position consist of a circular spring 56 which carries two resilient clip members 58 mounted upon straight portions 60 of the spring. Spring 56 rests in a circular groove 62 around flange 24.

A modified form of ullage rod 33 is attached to cap 50, being vertically positioned in a bearing 64 similar to that previously described. The ullage rod is formed of a tubular member and has a straight body portion 66 with a vent opening 70 therein and an arcuate curved upper portion 68. The lower end of the body portion 66 is flattened and forms a socket for an elongated bar or measuring unit 72 comprising a flat strip bent back upon itself. This unit is of such length as to extend down into the reservoir to a point above the master cylinder 12 and has a side 74 containing a plurality of corrugations 76. We have found that an appreciable amount of fluid will be retained upon the ledges of the corrugations upon the withdrawal of the measuring unit from the reservoir, thus indicating the level of the fluid.

In Figs. 6 and 7 we have illustrated a modified form of measuring unit. We have formed a measuring unit from wire fastened into the lower end of the ullage rod body portion 66. The wire is doubled upon itself, having a loop 80 at its bottom and two parallel upwardly extending portions, each of which is formed into sine curves in opposite directions, providing in effect a plurality of superposed loops 82 (Fig. 7). In practice it has been found that fluid is retained in these loops, thus serving to indicate the fluid level in the reservoir.

In Fig. 8 we have illustrated a measuring unit 90 which is fastened into the lower end of the ullage rod body portion 66. This unit comprises a thin strip of metal having a plurality of vertically aligned openings 92 for retaining fluid in the same manner as the previously described device.

Having thus described our invention, it is obvious that numerous departures may be made from the structure shown and described, and we do not wish to be limited to the specific form, construction and combination of parts as shown, but rather by the following claims.

We claim:

1. In combination, a fluid reservoir for a hydraulic braking system, a filling cap having an aperture therein, and a combination ullage rod and ventiduct positioned in said aperture in axial alignment therewith, comprising a tube having an arcuate bend in its external portion and a flattened out portion extending down inside the reservoir below the liquid level, and indicating means on the flattened portion, said tube having a vent opening therein above the liquid level.

2. In combination, a fluid reservoir for a hydraulic braking system, a filling cap having an aperture therein, and a combination ullage rod and ventiduct positioned in said aperture in axial alignment therewith, comprising a tube having a portion extending above said cap and a portion below said cap flattened to form a rectangular cross-section, and indicating means on said flattened portion, said tube having a vent opening therein above the liquid level communicating through said tube with the atmosphere.

3. A combination ullage rod and ventiduct comprising a tubular body having one end arcuately bent, a straight tubular portion having an opening in the wall thereof, and an elongated portion of said tubular body flattened upon itself and having indicia on a flattened side for designating the level of a fluid.

WALLACE F. OLIVER.
JOSEPH R. HEIDLOFF.